US009119505B2

(12) United States Patent
Guard et al.

(10) Patent No.: US 9,119,505 B2
(45) Date of Patent: Sep. 1, 2015

(54) COFFEE BREWER AND A CORRESPONDING NETWORK-BASED METHOD AND APPARATUS (75) Inventors: Brent Guard, Southampton (GB); Gary Burton-Wilcock, Kidlington (GB)

(73) Assignee: Kraft Foods R & D, Inc., Deerfield, IL (US)

( * ) Notice: Subject to any disclaimer, the term of this patent is extended or adjusted under 35 U.S.C. 154(b) by 473 days.

(21) Appl. No.: 12/360,950

(22) Filed: Jan. 28, 2009

(65) Prior Publication Data

US 2009/0219140 A1 Sep. 3, 2009

(30) Foreign Application Priority Data

Jan. 29, 2008 (EP) .................................... 08250344

(51) Int. Cl.
*H04Q 5/22* (2006.01)
*A47J 31/40* (2006.01)
(Continued)

(52) U.S. Cl.
CPC ................ *A47J 31/52* (2013.01); *A47J 31/407* (2013.01); *A47J 31/4407* (2013.01); *A47J 31/4492* (2013.01); *A47J 31/369* (2013.01)

(58) Field of Classification Search
CPC ..... A47J 31/4492; A47J 31/369; A47J 31/46; A47J 31/3676; A47J 31/3623; A47J 31/057; A47J 31/42; A47J 31/0621; A47J 31/52; A47J 31/407; A47J 31/4407; B65B 29/02; B65B 29/04; G07F 13/065
USPC ................... 340/539.13, 572.1, 10.1, 825.49, 340/870.16, 10.2, 10.3, 10.32, 572.4, 340/539.14, 10.4, 10.42, 10.51, 10.52, 340/10.41, 870.11, 825.73, 7.21, 825.69, 340/825.72, 572, 505, 825.54, 825.34, 340/825.31, 572.7, 572.2; 426/231, 433, 426/590, 87, 115, 431, 591, 112; 99/280, 99/282, 285, 295, 279, 283, 286, 275; 705/1, 16, 26, 500, 22, 28; 700/240, 700/236, 231, 233, 239, 283, 285; 222/129.1
See application file for complete search history.

(56) References Cited

U.S. PATENT DOCUMENTS 4,484,515 A 11/1984 Illy
5,579,221 A 11/1996 Mun
(Continued)

FOREIGN PATENT DOCUMENTS

CN 101073468 A 11/2007
EP 0446500 B1 4/1999
(Continued)

OTHER PUBLICATIONS

Office Action issued in counterpart Chinese Application No. 200910130711.X dated Jan. 16, 2013 and English translation of the same (17 pages).
(Continued)

*Primary Examiner* — Mirza Alam
(74) *Attorney, Agent, or Firm* — Fitch, Even, Tabin & Flannery LLP (57) ABSTRACT

A coffee brewing apparatus comprises a corresponding coffee brewer as well as a sensor that is configured and arranged to sense food components as used by that means for brewing coffee beverages. This coffee brewing apparatus then further comprises an external network interface that is configured and arranged to facilitate interfacing with a remote resource (or resources). The coffee brewing apparatus can further comprise an end user interface and a processor that is operably coupled to the sensor, the external network interface, and the end user interface and that is configured and arranged to independently use information regarding food components as are used by the means for brewing coffee beverages to facilitate obtaining corresponding responsive information from the remote resource and to then present that information to an end user via the end user interface.

32 Claims, 2 Drawing Sheets (51) Int. Cl.
  *A47J 31/06*  (2006.01)
  *A23L 1/28*   (2006.01)
  *B67D 7/74*   (2010.01)
  *A47J 31/52*  (2006.01)
  *A47J 31/44*  (2006.01)
  *A47J 31/36*  (2006.01)

(56) References Cited

U.S. PATENT DOCUMENTS

| | | | |
|---|---|---|---|
| 5,787,149 | A | 7/1998 | Yousefi et al. |
| 6,095,031 | A | 8/2000 | Warne |
| 6,227,101 | B1 | 5/2001 | Rabadi et al. |
| 6,275,166 | B1 | 8/2001 | del Castillo et al. |
| 6,314,406 | B1 | 11/2001 | O'Hagan et al. |
| 6,564,999 | B1 * | 5/2003 | Saveliev et al. ............ 235/383 |
| 6,587,739 | B1 | 7/2003 | Abrams et al. |
| 6,990,391 | B1 * | 1/2006 | Cunha et al. ............... 700/237 |
| 7,028,906 | B2 | 4/2006 | Challa et al. |
| 7,110,829 | B2 * | 9/2006 | Cunningham et al. ........... 700/2 |
| 7,223,427 | B2 * | 5/2007 | Knepler ...................... 426/231 |
| 7,251,617 | B1 | 7/2007 | Walker et al. |
| 7,673,558 | B2 | 3/2010 | Panesar et al. |
| 2002/0011923 | A1 | 1/2002 | Cunningham et al. |
| 2002/0088816 | A1 * | 7/2002 | Vaitkus et al. ................. 221/9 |
| 2003/0074194 | A1 | 4/2003 | Finnegan |
| 2003/0079612 | A1 | 5/2003 | Con |
| 2003/0129286 | A1 | 7/2003 | Knepler |
| 2004/0267382 | A1 | 12/2004 | Cunningham et al. |
| 2005/0139084 | A1 * | 6/2005 | Caswell ........................ 99/286 |
| 2006/0096997 | A1 | 5/2006 | Yeo |
| 2006/0271437 | A1 | 11/2006 | Maggio |
| 2007/0068393 | A1 * | 3/2007 | Nosler et al. ................. 99/279 |
| 2007/0175334 | A1 | 8/2007 | Halliday et al. |
| 2007/0187425 | A1 * | 8/2007 | Knepler ...................... 221/221 |
| 2007/0203587 | A1 * | 8/2007 | Erlandsson et al. ............ 700/11 |
| 2007/0214055 | A1 | 9/2007 | Temko |
| 2007/0288252 | A1 | 12/2007 | Weinberg |
| 2008/0000358 | A1 * | 1/2008 | Goeckner et al. .............. 99/281 |
| 2008/0223217 | A1 * | 9/2008 | Teller et al. ................... 99/280 |

FOREIGN PATENT DOCUMENTS

| | | |
|---|---|---|
| EP | 1 637 055 A2 | 3/2006 |
| EP | 1676509 A1 | 7/2006 |
| EP | 1810598 A1 | 7/2007 |
| EP | 1890271 A1 * | 2/2008 |
| JP | 05-233946 | 9/1993 |
| JP | 05-233946 | 10/1993 |
| JP | 2000-040176 | 2/2000 |
| JP | 2000-276647 A | 6/2000 |
| JP | 2000-040176 A | 8/2000 |
| JP | 2000-276647 | 10/2000 |
| JP | 2002013741 A | 1/2002 |
| JP | 2002-063456 | 2/2002 |
| JP | 2002171292 A | 6/2002 |
| JP | 2003192096 A | 7/2003 |
| JP | 2004-133559 | 4/2004 |
| JP | 2004-535854 | 12/2004 |
| JP | 2005-309544 | 11/2005 |
| JP | 2006153430 A | 6/2006 |
| JP | 2007-310492 | 11/2007 |
| WO | 99/23888 A1 | 5/1999 |
| WO | 0143088 A1 | 6/2001 |
| WO | 0245559 A1 | 6/2002 |
| WO | 02/099708 A1 | 12/2002 |
| WO | 03005295 A1 | 1/2003 |
| WO | 03/098561 A1 | 11/2003 |
| WO | 2005063091 A1 | 7/2005 |
| WO | 2005067385 A2 | 7/2005 |
| WO | WO 2005063091 A1 * | 7/2005 |
| WO | 2006050563 A1 | 5/2006 |

OTHER PUBLICATIONS

Office Action issued in counterpart Japanese Application No. 2009-016956 dated Feb. 15, 2013 and English translation of the same (8 pages).
Results of Reference Search performed before Jan. 29, 2008, 634 pages.
European Patent Office, Communication of Notices of Opposition dated Oct. 12, 2012, from related European Patent No. 2085000, 33 pages.
Communication pursuant to Article 94(3), dated Jan. 3, 2011, from related European Patent App. No. 08250344.2, 7 pages.
Response to Communication, Response dated Apr. 18, 2011, from related European Patent App. No. 08250344.2 6 pages.
Japanese Patent Office, Official Notice of Rejection mailed Jun. 24, 2014, from related Japanese Patent App. No. 2013-168964, 6 pages.
Office Action from corresponding Japanese Patent App. No. 2009-016956, mailed Feb. 4, 2014, 6 pages.
Results of search performed before Jan. 29, 2008, 616 pages.
Canadian Patent Office, Official Action mailed Oct. 14, 2014, from corresponding Canadian Patent App. No. 2,651,162, 3 pages.
Japanese Patent Office, Official Notice of Final Decision of Rejection mailed Feb. 3, 2015, from related Japanese Patent App. No. 2013-168964, 4 pages.
Nestec S.A., Response to Communication of The patentee, Response dated Oct. 17, 2013 from Opposition of related European Patent No. 2085000 B1, 9 pages.
European Patent Office, Summons to attend oral proceedings dated Nov. 17, 2014, from Opposition of related European Patent No. 2085000 B1, 8 pages.
Patent Proprietors, Auxiliary Requests for Oral Proceedings from Opposition of related European Patent No. 2085000 B1, 67 pages.
Korean Patent Office, Notice of Preliminary Rejection dated Feb. 23, 2015, from corresponding Korean Patent App. No. 10-2009-6995, 4 pages.
Office Action received Jun. 2, 2015, from corresponding Taiwanese patent application No. 098102795, 4 pages.

* cited by examiner

COFFEE BREWER AND A CORRESPONDING NETWORK-BASED METHOD AND APPARATUS

TECHNICAL FIELD

This invention relates generally to coffee brewers and more particularly to coffee brewers having communications capabilities.

BACKGROUND

Coffee brewing apparatuses of various kinds are known in the art. These include machines that brew coffee using preground coffee beans or liquid coffee extract as well as machines that grind coffee beans themselves as part of the brewing process. This also includes machines that make use of a wide variety of coffee bean (ground or unground) carriers. In some cases the ground coffee beans are loose and are simply deposited into a brewing container. In other cases, as when using a pod-based system, the ground coffee beans are provided in a container that is placed within the coffee brewer. Such a container may contain a quantity of material sufficient to support only a single brewing cycle or may contain enough grounds for multiple brewing cycles. In some cases the container may comprise an integral part of the brewing process and in other cases the container may simply retain the grounds until those grounds are needed by the brewing apparatus.

It has been suggested that coffee brewers can comprise a part of a local area network of appliances within a home. In such a case, a plurality of household appliances are communicatively networked, one to another, with one of those appliances also serving as a local server that connects to an external network such as the Internet. Being networked in this manner, a homeowner may be able to control various of the appliances from a remote location. For example, the homeowner may be able to access the master appliance via the Internet and, via that master appliance, then instruct other of the appliances, such as a coffee brewer, to begin functioning at some particular prearranged time.

Such an approach may provide some useful opportunities in at least some application settings. Unfortunately, this approach poses any number of obstacles to convenient installation and operation. As but one observation in this regard, this prior art approach requires the provision and use of at least two appliances to form the desired home-based local area network. This requirement alone, of course, can require a level and degree of appliance-based communications and operational compatibility that may be lacking in the average home absent a considerable capital investment.

It is also not unlikely that such an approach will typically require a level of knowledge, skill, and expertise on the part of the homeowner that is unlikely to be met in a considerable number of cases. It is a point of concern, for example, that many people experience difficulties of various kinds when trying to establish and maintain a relatively simple home-based wireless local area network such as a WIFI-based network. The problems and troubles often raised in this regard take on a new level of concern when applied in the context of home appliances that utilize heat and/or mechanical actuators to effect their ordinary functions.

BRIEF DESCRIPTION OF THE DRAWINGS

The above needs are at least partially met through provision of the coffee brewer and a corresponding network-based method and apparatus described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that cern actions and/or steps may be described or depicted in a particular order of occurrence while those skilled in the art will understand that su ecificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

SUMMARY

Generally speaking, pursuant to these various embodiments, a coffee brewing apparatus comprises a corresponding means for brewing coffee beverages as well as a sensor that is configured and arranged to sense food components as used by that means for brewing coffee beverages. This coffee brewing apparatus then further comprises an external network interface that is configured and arranged to facilitate interfacing with a remote resource (or resources). The coffee brewing apparatus can further comprise an end user interface and a processor that is operably coupled to the sensor, the external network interface, and the end user interface and that is configured and arranged to independently use information regarding food components as are used by the means for brewing coffee beverages to facilitate obtaining corresponding responsive information from the remote resource and to then present that corresponding responsive information to an end user via the end user interface.

These teachings will accommodate considerable flexibility in these regards. For example, the aforementioned sensor can comprise an optical code reader, a radio frequency identification tag reader, or any other sensor as may suffice for the task. Similarly, the aforementioned external network interface can comprise, for example, a modem.

It will also be understood and appreciated that the coffee brewing apparatus may communicate with a remote resource regarding other matters in addition to matters other than the food components and/or the responsive information. Examples in this regard might include, but are not limited to, coffee brewing apparatus usage patterns, coffee brewing apparatus diagnostic information, direct end user exchanges with a customer service resource, non-price-based food component information, and so forth. It would also be possible, of course, to leverage such a capability to provide promotional content as well if desired.

So configured, it will be understood and appreciated that numerous external network-based benefits are achieved without also requiring the presence of a multi-appliance local network. The described capabilities can be incorporated into a single coffee brewing apparatus and rendered operational in as transparent a manner as may be desired. This, in turn, permits the opportunity to provide an end user with the numerous benefits of such a capability without also requiring that end user to themselves become a local area network expert or to necessarily retain the services and attention of such an individual. It will further be recognized, of course, that these teachings are readily scaled to accommodate an application setting where other appliances are present that are, in fact, capable of cooperating with one another via an available communications pathway.

DETAILED DESCRIPTION

Figure 1:
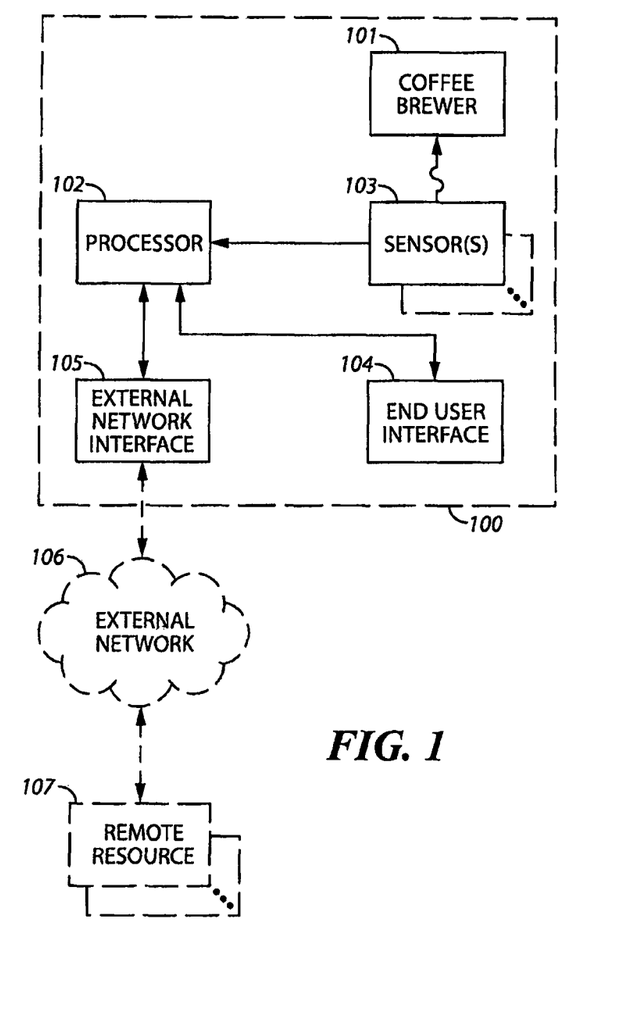
FIG. 1 comprises a block diagram as configured in accordance with various embodiments of the invention.

These and other benefits may become clearer upon making a thorough review and study of the following detailed description. Referring now to the drawings, and in particular to FIG. 1, an illustrative example of a coffee brewing apparatus 100 as comports with these teachings will be described. Those skilled in the art will recognize and understand that this example is intended to serve only in an illustrative capacity and is not intended to comprise an exhaustive listing of all possibilities in this regard.

This coffee brewing apparatus 100 comprises, as one might expect, a coffee brewer 101. Various coffee brewing mechanisms are known in the art and others are likely to be developed in the future. Examples in this regard include, but are not limited to, coffee brewers that combine ground coffee beans with water. There are various ways by which this interaction can occur, including boiling water having coffee grounds contained therein, forcing water through the coffee grounds under high pressure, allowing the water to pass through the coffee grounds as a function of gravity, and using a so-called steeping process to separate the coffee grounds from the water. Some coffee brewers make use of packets of coffee grounds, such as a coffee bag or a pod. Any of these techniques can be employed to provide any number of cups of coffee, depending in part upon the size of the coffee brewer itself.

For the purposes of simplicity and clarity, and not by way of limitation, the following description will presume that the coffee brewer 101 comprises a pod-styled coffee brewer such as a Tassimo brand coffee brewer. Those skilled in the art will recognize that other possibilities exist in this regard as well with yet others likely to be developed going forward.

This coffee brewing apparatus 100 also comprises a sensor 103. This sensor 103 is configured and arranged to sense food components as are used by the coffee brewer 101. There are various known sensors that may be employed in this manner. As one example in this regard, when the coffee pods as used by the coffee brewer 101 each bear an optical code (such as, but not limited to, a bar code or the like) that identifies, to a greater or a lesser degree, the coffee pod itself (such as its contents, its date of manufacture and/or a "use by" date, special handling instructions, and so forth), the sensor can comprise an optical code reader that is configured and arranged to optically scan the coffee pod's optical code. Optical code readers of various kinds, of course, are well known in the art.

As another example in this regard, when the coffee pod bears a radio frequency identification code (commonly referred to as an RFID tag) (which again may contain information such as that suggested above), the sensor 103 can comprise a radio frequency identification tag reader. Again, such readers already comprise a very well understood area of endeavor and require no further explanation here regarding their manner of operation. Other possibilities exist as well. For example, the sensor 103 could comprise an image capture device, such as a digital camera, that operates in conjunction with object recognition software/hardware to identify the coffee pod by sight.

By one approach, only a single sensor 103 may suffice to serve this need in a given application setting. If desired, however, this sensor 103 may comprise a plurality of sensors (as suggested by the phantom-line box shown in FIG. 1). These may be essentially identical sensors (as when optical code readers are positioned at various locations) or these may be sensors that use differing technologies to effect their purpose (as when a first sensor comprises an optical code reader and a second sensor comprises an image-recognition platform, for example).

As noted, this sensor 103 serves to sense one or more food components as are used by the coffee brewer 101. This can comprise, for example, identifying the particular food component by noting, for example, that a coffee pod as made by a particular manufacturer and which contains a particular brand, style, flavor, and grind of coffee has been placed in, or removed from, the coffee brewer 101. This can also comprise, if desired, identifying whether the food component is beyond a usable shelf life date, whether the food component is, in fact, one intended for use in the coffee brewer 101, whether the quantity of the food component is less than, or more than, recommended limits in those regards, and so forth. Those skilled in the art will recognize that other possibilities exist in this regard and that this particular example is intended to serve as an illustrative, non-limiting example.

The coffee brewing apparatus 100 also comprises an end user interface 104. The expression "end user" refers, of course, to a person who interacts directly with the coffee brewing apparatus 100 when using the latter for its intended purpose; i.e., to brew one or more cups of coffee. This end user interface 104 can comprise both mechanisms to impart information to the end user (such as, but not limited to, an active display (such as a liquid crystal display), an audio transducer such as a speaker, and so forth) and mechanisms to receive information and/or instructions from the end user (such as, but not limited to, a touch screen display, a keypad or keyboard, a cursor control device, a voice recognition mechanism, and so forth).

This end user interface 104 can be configured and arranged to support and facilitate the ordinary functioning of the coffee brewer 101 if desired but can also serve, as will be described herein, to facilitate the additional functionality and capabilities that become possible via these present teachings.

This coffee brewing apparatus 101 then further comprises a processor 102 that operably couples to at least the sensor 103 and the end user interface 104 and also to an external network interface 105 that will be described below. This processor can comprise a dedicated purpose hard-wired platform, if desired, or can comprise a partially or wholly programmable platform as desired. Such architectural options are well known in the art. For the purposes of this illustrative example, and not by way of limitation, it will be presumed that this processor 102 comprises an appropriately programmed microprocessor or microcontroller (it being understood that the programming of such a platform to facilitate the teachings set forth herein is well within the grasp of the ordinarily skilled technician).

So configured, the processor 102 is configured and arranged to interact with the sensor 103 to thereby receive information regarding food components as are used by the coffee brewer 101. To continue the example begun above, for instance, this can comprise receiving information regarding a coffee pod being used (or that will be used, or that has been used) by the coffee brewer 101. The processor 102 can then take subsequent actions as a function, at least in part, of this received information.

As noted above, the processor 102 couples to an external network interface 105. This external network interface 105 can comprise, for example, a modem. Various modem technologies are known in the art that are readily applied in this application setting. Some useful non-limiting examples in this regard include a General Packet Radio Service (GPRS) modem, a Bluetooth modem, an 802.11-compatible modem (such as, but not limited to, 802.11(a), 802.11(b), 802.11(g), 802.11(n), and so forth), a Public Switched Telephone Network (PSTN) modem, a power line carrier-based modem (such as an X10 power line modem), and so forth.

This external network interface 105 is configured and arranged to facilitate interfacing with a remote resource 107 via, for example, an intervening external network 106 (or networks) such as, but not limited to, the Internet. As used herein, the expression "remote resource" will be understood to refer to a resource 107 that is physically discrete from, and greatly geographically removed from, the coffee brewing apparatus 100. This geographic separation may be many miles in length, or even separation as measured by continents and/or oceans.

Pursuant to these teachings, then, the processor 102 is configured and arranged to independently use information regarding food components as are used by the coffee brewer 101 to automatically facilitate obtaining corresponding responsive information from the remote resource 107 and to present that information to an end user via the end user interface 104. As used herein, the reference to "independent" will be understood to refer to a native ability of the processor 102 to effect this functionality without the assistance or control of another household appliance as typifies the prior art in this regard. That is to say, the processor 102 does not require, nor expect, instructions from a co-appliance to effect the described functionality nor does the processor 102 require the presence of such a co-appliance in order to accomplish this functionality.

This corresponding responsive information can of course vary with the application setting. By one approach, for example, this information may comprise a warning or caution when the food component is somehow unsafe or inappropriate for use in the coffee brewer 101. By another approach, as when the coffee brewer 101 is not already programmed to properly operate using this particular food component, the information may comprise (in addition to new programming for the coffee brewer 101) information to provide to the end user regarding a programming update, altered brewing times, altered brewing process steps that may be noticeable to the end user, altered brewing process steps that may require the end user to insert additional food components to complete the brewing process, and so forth. It would also be possible to support promotional activities via this activity. This might include, for example, providing corresponding food component purchasing opportunities via this step.

Figure 2:
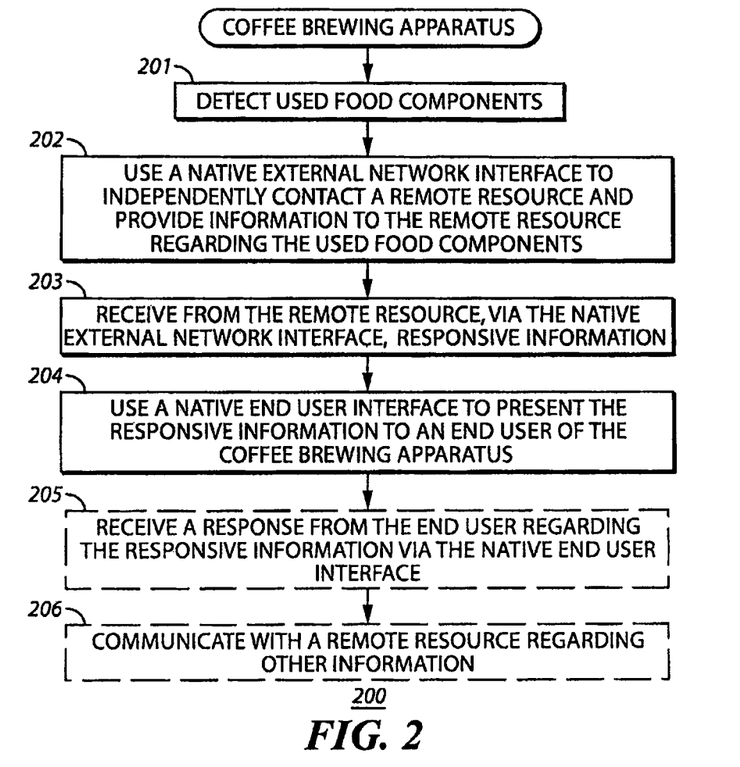
FIG. 2 comprises a flow diagram as configured in accordance with various embodiments of the invention.

Referring now to FIG. 2, an illustrative example of a corresponding process 200 in this regard will be provided. This process 200 can be carried out by a coffee brewing apparatus such as the one described above and begins with detecting 201 food components as are used by the coffee brewing apparatus. As noted above, this can comprise detecting a single kind of food component or any of a plurality of different kind of components (including, if desired, both appropriately and inappropriately sized and/or configured food components). For example, and again presuming for the sake of example that this coffee brewing apparatus comprises, at least in part, a Tassimo brand coffee brewer, this step may comprise detecting any of a variety of coffee pods (including different brands of coffee, different grinds, and decaffeinated varieties, for example), chocolate additives, milk-based additives, flavor syrups, teas, and so forth as are presently available or which become available in the future. The aforementioned sensor 103 can provide the relevant input to the processor 102 to accomplish this step.

This process 200 then provides for using 202 a native external network interface (such as the one described above) to independently contact a remote resource and provide information to that remote resource regarding the food component as used by the coffee brewing apparatus. By one approach, the particular remote resource contacted in this way can vary as a function, for example, of the particular detected food component. When the food component comprises a coffee pod containing coffee offered by a first manufacturer, the remote resource can comprise, for example, a web site/server operated by or for that first manufacturer. Similarly, when the food component comprises a coffee pod containing coffee offered by a second, different manufacturer, the remote resource can comprise a web site/server operated by or for that second manufacturer. In such a case, the above described processor can be programmed to use information provided by the sensor to identify the appropriate remote resource to contact in this step.

Generally speaking, this step can comprise, by one approach, using a Uniform Resource Locator (URL) as corresponds to the desired remote resource. The correct URL may already be known to the processor, may be provided to the processor by the sensor (when that URL comprises part of the information that is gleaned from the food component by the sensor), or may be provided to the processor from another, different remote resource that serves the purpose of correlating the URL based upon other information provided by the processor (such as other identifying information for the food component such as a manufacturer's name).

This process 200 then next provides for receiving 203 from the remote resource, via the native external network interface, responsive information as noted above. This might comprise, for example, information regarding corresponding cautions as pertain to the age, size, or other concerns regarding the appropriateness of this particular food component. This might also comprise, for example, information regarding alterations to the brewing process that are recommended or necessary as a result of using this particular food component. By this approach, the apparatus can remain current with respect to its functional capabilities as regards the proper processing of newly introduced food components or the like.

If desired, this information can also comprise an offer to purchase additional quantities of the food component itself (either at a normal or at a discounted price). This might also comprise, as another example, an offer to purchase a different albeit related food component (such as a different flavor of coffee, a different brand of coffee, or the like). These offers can be time limited if desired or open ended. These offers can also comprise offers that can be acted upon immediately by the end user or offers that require the end user to visit, for example, a local grocery store.

This process 200 will, of course, accommodate presenting this received information to the end user via the aforementioned end user interface. This can comprise, for example, using an active display to present the end user with textual and/or graphic content that expresses the information. As another example, when the end user interface includes an audio transducer, this can comprise rendering audible a verbal message that expresses the information (in whole or in part as appropriate or as desired). Of course, when both capabilities are available, this can comprise an audio/visual presentation. In all of these cases the content itself can be received and processed as a file transfer or as streaming content as appropriate.

For the purposes of many application settings, such information can be provided to the end user essentially upon receiving that information from the remote source. If desired, however, the processor can arrange for the storage of such information (using onboard or off-board memory resources) until such time as the end user may request that such information be provided. By this approach, although the content is automatically pushed to the coffee brewing apparatus, the content is not pushed to the end user; rather than content is pulled to the end user upon some expression of interest on the part of the end user.

If desired, this process 200 can optionally also provide for receiving a response from the end user (via, for example, the end user interface) regarding the information. This might involve, for example, detecting input, instructions, and/or responses as are entered by the end user via a keyboard or the like. Such end user input can then be forwarded by the processor to the remote resource for corresponding handling. As one simple example in this regard, when the response comprises, for example, an acceptance of a food component purchasing opportunity, the remote resource can respond by completing the sales transaction and effecting delivery of the purchased commodity to the end user.

If desired, the latter process can include some authorization and/or verification process to verify that the end user is authorized to effect such an order. This might be accomplished using any of a wide variety of known techniques including but not limited to presentation of a personal identification number (i.e., a PIN), a user name and password, a bioidentifier (such as a finger print via a finger print scanner as may comprise a part of the end user interface), and so forth.

This process 200 will also optionally accommodate communicating 206 with a remote resource regarding other information. This would permit, for example, the end user and/or the coffee brewing apparatus to provide or exchange information with the remote resource regarding one or more of:
    coffee brewing apparatus usage patterns;
    coffee brewing apparatus diagnostic information;
    direct end user exchanges with a customer service resource;
    non-price-based food component information (such as nutritional information, allergen content information, drug interaction information, and so forth);
and so forth, to note but a few examples in this regard. This could also comprise, if desired, the exchange of promotional content.

Figure 3:
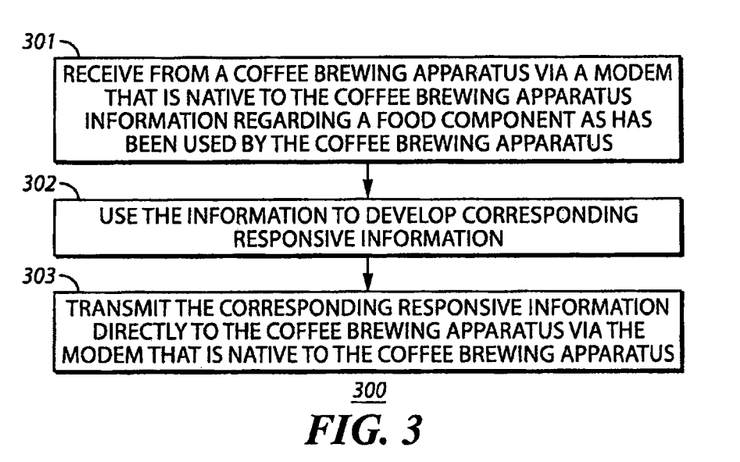
FIG. 3 comprises a flow diagram as configured in accordance with various embodiments of the invention.

To further facilitate such activities, and referring now to FIG. 3, a corresponding supportive process 300 for use by a remote resource such as those noted above can provide for receiving 301 information regarding a food component as has been used by a coffee brewing apparatus from that coffee brewing apparatus via a modem that is native to that coffee brewing apparatus. The remote resource can then use 302 this information to develop the aforementioned information and to transmit 303 this information directly to the coffee brewing apparatus via, again, the modem that is native to the coffee brewing apparatus.

When the information includes or comprises information regarding a purchasing opportunity, that opportunity can comprise a static offer (i.e., one that has been previously defined and held in readiness) or can comprise a dynamic offer. A dynamic offer, for example, can comprise an offer that is generated at the moment of need or opportunity based upon such information as may be presently available and which, to a greater or lesser extent, is developed as a function of the available information. In either case, the information provided can comprise audible information and/or information that is formatted to be visually displayed to the end user of the coffee brewing apparatus via a display as may comprise a native part of the aforementioned end user interface.

So configured, those skilled in the art will recognize and appreciate that services and functionality become available in a manner, and to an extent, that have not previously been the case. Such a coffee brewing apparatus can function at a high level in these regards without a need for a household appliance network (although the disclosed embodiments would be usable with such a network if and when it was present in a given application setting). The described functionality can operate in a highly automated fashion, thereby yielding its information benefits to virtually end user including end users who are befuddled by modern communications technologies. An end user, simply by engaging in the normal minimal activities associated with brewing a cup of coffee, is automatically, quickly, transparently, and easily provided with a useful corresponding information that may well be of interest to them while they are at the coffee brewing apparatus.

Those skilled in the art will also recognize and understand that these teachings are also readily scaled to accommodate a variety of additional functions and purposes. As one example in this regard, the aforementioned process can be configured and arranged to facilitate a Voice over Internet Protocol (VoIP)-based voice communication using the external network interface and the end user interface. Such a capability might be limited to use when communicating with the aforementioned remote resource or might, if desired, be used to serve the general purpose telephonic communications needs of the end user.

Numerous other possibilities exist as well. By one approach, for example, this coffee brewing apparatus might be usable to order other foodstuffs or other commodities besides coffee-related food components. This might include, for example, presenting the end user with corresponding purchasing opportunities via the end user display as may be provided or supported by any of a variety of remote resources.

As another example, the network connectivity capabilities of this coffee brewing apparatus can be further leveraged to permit an end user to upload and/or download one or more user preferences as may be retained by a given remote resource. By this approach, a guest can easily arrange for the coffee brewing apparatus to prepare a desired beverage in accordance with possibly complex personal requirements without the guest having to themselves program the coffee brewing apparatus in this regard. Instead, the coffee brewing apparatus can access the requisite requirements from a remote resource (upon presenting, for example, some appropriate identifier for the guest) in order to have those requirements available for local use.

As yet another example in this regard, sweepstakes-like codes could be placed on food components such as coffee pods. Upon placing the pod into the coffee brewing apparatus, the sensor could obtain the code and the processor could forward that code to a sweepstakes-facilitating remote resource to determine the status of that code (i.e., winning, losing, and so forth). In this case, if desired, the end user could receive information regarding whether they have won a prize via their end user interface during the same time that their beverage is being brewed. In such a case, it may be appropriate for the sweepstakes code to be unique with respect to the contest in accordance with known practice in this regard.

And as yet one more example in this regard, such a coffee brewing apparatus could employ the described functionality to automatically upgrade its own operating firmware and/or software from time to time as desired. This might occur, for example, on some regularly scheduled basis and/or in response to an announcement (received via the external network interface) that such an update is available.

Those skilled in the art will recognize that a wide variety of other modifications, alterations, and combinations can be made with respect to the above described embodiments without departing from the spirit and scope of the invention, and that such modifications, alterations, and combinations are to be viewed as being within the ambit of the inventive concept.

We claim:

1. A coffee brewing apparatus that comprises:
    a coffee brewer;
    a sensor configured and arranged to sense food components as used by the coffee brewer, wherein sensing food components comprises sensing information provided on a coffee pod containing the food components that includes at least one of information corresponding to a brand of the food component, information corresponding to a flavor of the food component, information corresponding to a grind of the food component, and information identifying whether the coffee pod is intended for use in the coffee brewer;
    an external network interface configured and arranged to facilitate interfacing with a remote resource;
    an end user interface including an active display;
    a processor operably coupled to the sensor, the external network interface, and the end user interface and being configured and arranged to independently use information regarding food components used by the coffee brewer to facilitate obtaining responsive information from the remote resource and presenting the responsive information to an end user via the end user interface including presenting via the active display at least one of textual content and graphic content that corresponds to the responsive information;
    the end user interface being capable of receiving an acceptance by the end user of a food component purchasing opportunity; and
    the processor and external network interface being capable of facilitating a verification of the end user to accept the food component purchasing opportunity.

2. The coffee brewing apparatus of claim 1 wherein the sensor comprises, at least in part, an optical code reader.

3. The coffee brewing apparatus of claim 1 wherein the sensor comprises, at least in part, a radio frequency identification tag reader.

4. The coffee brewing apparatus of claim 1 wherein the external network interface comprises a modem.

5. The coffee brewing apparatus of claim 4 wherein the modem comprises at least one of:
    a General Packet Radio Service (GPRS) modem;
    a Bluetooth modem;
    a 802.11-compatible modem;
    a Public Switched Telephone Network (PSTN) modem;
    a power line carrier-based modem.

6. The coffee brewing apparatus of claim 1 wherein the end user interface includes an input configured and arranged to receive input from the end user, and the processor is further configured and arranged to receive responses from the end user regarding the responsive information.

7. The coffee brewing apparatus of claim 1 wherein the processor is further configured and arranged to interface with a remote resource regarding other information.

8. The coffee brewing apparatus of claim 7 wherein the other information comprises, at least in part, at least one of:
    coffee brewing apparatus usage patterns;
    coffee brewing apparatus diagnostic information;
    direct end user exchanges with a customer service resource;
    non-price-based food component information.

9. The coffee brewing apparatus of claim 1 wherein the processor is further configured and arranged to automatically facilitate obtaining information from the remote resource and present the information to the end user via the end user interface.

10. The coffee brewing apparatus of claim 1 wherein the processor is further configured and arranged to facilitate a Voice over Internet Protocol (VoIP)-based voice communication using the external network interface and the end user interface.

11. A method comprising:
    at a coffee brewing apparatus:
        detecting food components as are used by the coffee brewing apparatus, wherein the detecting comprises a sensor sensing information provided on a coffee pod containing the food components, the information including at least one of information corresponding to a brand of the food component, information corresponding to a flavor of the food component, information corresponding to a grind of the food component, and information identifying whether the coffee pod is intended for use in the coffee brewing apparatus;
        using a native external network interface to independently contact a remote resource and provide information to the remote resource regarding the food components as are used by the coffee brewing apparatus;
        receiving from the remote resource, via the native external network interface, responsive information that includes information regarding a food component purchasing opportunity;
        using a native end user interface to present the responsive information to an end user of the coffee brewing apparatus;
        receiving an acceptance of the food component purchasing opportunity by an end user;
        facilitating a verification of the end user to accept the food component purchasing opportunity.

12. The method of claim 11 wherein using a native external network interface by includes using a modem.

13. The method of claim 12 wherein using a modem includes using at least one of:
    a General Packet Radio Service (GPRS) modem;
    a Bluetooth modem;
    a 802.11-compatible modem;
    a Public Switched Telephone Network (PSTN) modem;
    a power line carrier-based modem.

14. The method of claim 11 further comprising:
    receiving a response from the end user regarding the responsive information via the native end user interface.

15. The method of claim 11 further comprising:
    communicating with a remote resource regarding other information.

16. The method of claim 15 wherein communicating with a remote resource regarding the other information includes, at least in part, communicating with the remote resource regarding at least one of:

coffee brewing apparatus usage patterns;
coffee brewing apparatus diagnostic information;
direct end user exchanges with a customer service resource;
non-price-based food component information.

17. A method comprising:
receiving from a coffee brewing apparatus via a modem that is native to the coffee brewing apparatus information regarding a food component as has been used by the coffee brewing apparatus, wherein the coffee brewing apparatus is configured to sense, using a sensor, information provided on a coffee pod containing the food component, and wherein the information regarding the food component corresponds to the information provided on the coffee pod containing the food component and includes at least one of information corresponding to a brand of the food component, information corresponding to a flavor of the food component, information corresponding to a grind of the food component, and information identifying whether the coffee pod is intended for use with the coffee brewing apparatus;
using the information regarding the food component to develop corresponding responsive information that includes information regarding a food component purchasing opportunity;
transmitting the corresponding responsive information directly to the coffee brewing apparatus via the modem that is native to the coffee brewing apparatus, wherein the coffee brewing apparatus is further configured to present at least a portion of the responsive information to an end user via an end user interface;
receiving an acceptance of the food component purchasing opportunity by the end user; and
verifying that the end user is authorized to accept the food component purchasing opportunity.

18. The method of claim 17 wherein the corresponding responsive information is configured and formatted to be visually displayed to the end user of the coffee brewing apparatus via the end user interface, wherein the end user interface further comprises a display that is native to the coffee brewing apparatus.

19. The coffee brewing apparatus of claim 1 further comprising the coffee pod, wherein the coffee pod is a sealed machine-insertable pod.

20. A coffee brewing apparatus that comprises:
a brewer; and
a sensor configured to sense food components as used by the brewer, wherein sensing food components further comprises sensing information provided on a coffee pod containing the food components that includes at least one of information corresponding to a brand of the food component, information corresponding to a flavor of the food component, information corresponding to a grind of the food component, and information identifying whether the coffee pod is intended for use in the brewer;
an external network interface configured to facilitate interfacing with a remote resource;
an end user interface including an active display; and
a processor operably coupled to the sensor, the external network interface, and the end user interface and being configured to independently use information regarding food components used by the brewer to facilitate obtaining responsive information from the remote resource and presenting the responsive information to an end user via the end user interface including presenting via the active display at least one of textual content and graphic content that corresponds to the responsive information;
the end user interface being capable of receiving an acceptance by the end user of a food component purchasing opportunity; and
the processor and external network interface being capable of facilitating a verification of the end user to accept the food component purchasing opportunity.

21. The coffee brewing apparatus of claim 20 further comprising the coffee pod, wherein the coffee pod is a sealed machine-insertable pod.

22. The coffee brewing apparatus of claim 21 wherein the coffee pod has an outer surface with the information disposed thereon; and
the sensor is configured and arranged to sense the information on the outer surface of the coffee pod.

23. The coffee brewing apparatus of claim 1 wherein the remote resource is remote relative to both the coffee brewer and the coffee pod.

24. The coffee brewing apparatus of claim 1 wherein the external network interface is distinct from the sensor and functions independently of the sensor.

25. The method of claim 11 wherein the remote resource is removed from both the coffee brewing apparatus and the coffee pod by at least one mile and using the native external network interface to independently contact the remote resource includes using the native external network interface to independently contact the remote resource that is removed from both the coffee brewing apparatus and the coffee pod by at least one mile.

26. The method of claim 17 wherein the receiving, using, and transmitting are performed at a remote resource that is removed from the coffee brewing apparatus and the coffee pod by at least one mile.

27. A coffee brewing apparatus that comprises:
a brewer;
a sensor configured to sense food components as used by the brewer, wherein sensing food components includes sensing information provided on a coffee pod containing the food components that includes at least one of information corresponding to a brand of the food component, information corresponding to a flavor of the food component, information corresponding to a grind of the food component, and information identifying whether the coffee pod is intended for use in the brewer;
an external network interface configured to facilitate interfacing with a remote resource;
an end user interface including an active display; and
a processor operably coupled to the sensor, the external network interface, and the end user interface and being configured to independently use information regarding food components used by the brewer to obtain responsive information from the remote resource and present at least a portion of the responsive information to an end user via the end user interface including presenting via the active display at least one of textual content and graphic content that corresponds to the responsive information,
wherein the sensor is not a component of the external network interface;
the end user interface being capable of receiving an acceptance by the end user of a food component purchasing opportunity; and
the processor and external network interface being capable of facilitating a verification of the end user to accept the food component purchasing opportunity.

28. The coffee brewing apparatus of claim 27 further comprising the coffee pod, wherein the coffee pod is a sealed, machine-insertable pod.

29. The coffee brewing apparatus of claim 28 wherein the coffee pod has an outer surface with the information disposed thereon; and the sensor is configured to sense the information on the outer surface of the coffee pod.

30. The coffee brewing apparatus of claim 27 wherein the end user interface comprises a an input configured to receive input from the end user, and the processor is further configured to receive responses from the end user regarding the at least a portion of the responsive information.

31. The coffee brewing apparatus of claim 27 wherein the processor is further configured to automatically obtain responsive information from the remote resource and present the at least a portion of the responsive information to the end user via the end user interface.

32. The coffee brewing apparatus of claim 27 wherein the remote resource is removed from both the coffee brewing apparatus and the coffee pod by at least one mile.

\* \* \* \* \*

UNITED STATES PATENT AND TRADEMARK OFFICE
CERTIFICATE OF CORRECTION

PATENT NO. : 9,119,505 B2  
APPLICATION NO. : 12/360950  
DATED : September 1, 2015  
INVENTOR(S) : Brent Guard and Gary Burton-Wilcock Page 1 of 1

It is certified that error appears in the above-identified patent and that said Letters Patent is hereby corrected as shown below:

IN THE CLAIMS:

Column 10, line 50, in claim 12, after "interface" delete "by".

Column 13, line 7, in claim 30, after "comprises" delete "a".

Signed and Sealed this  
Twenty-ninth Day of March, 2016

Michelle K. Lee  
*Director of the United States Patent and Trademark Office*